Dec. 6, 1966   G. DE COYE DE CASTELET   3,289,564
AIR-CONDITIONING DEVICES FOR AUTOMOBILE VEHICLES
Filed Oct. 1, 1964                                             4 Sheets-Sheet 4

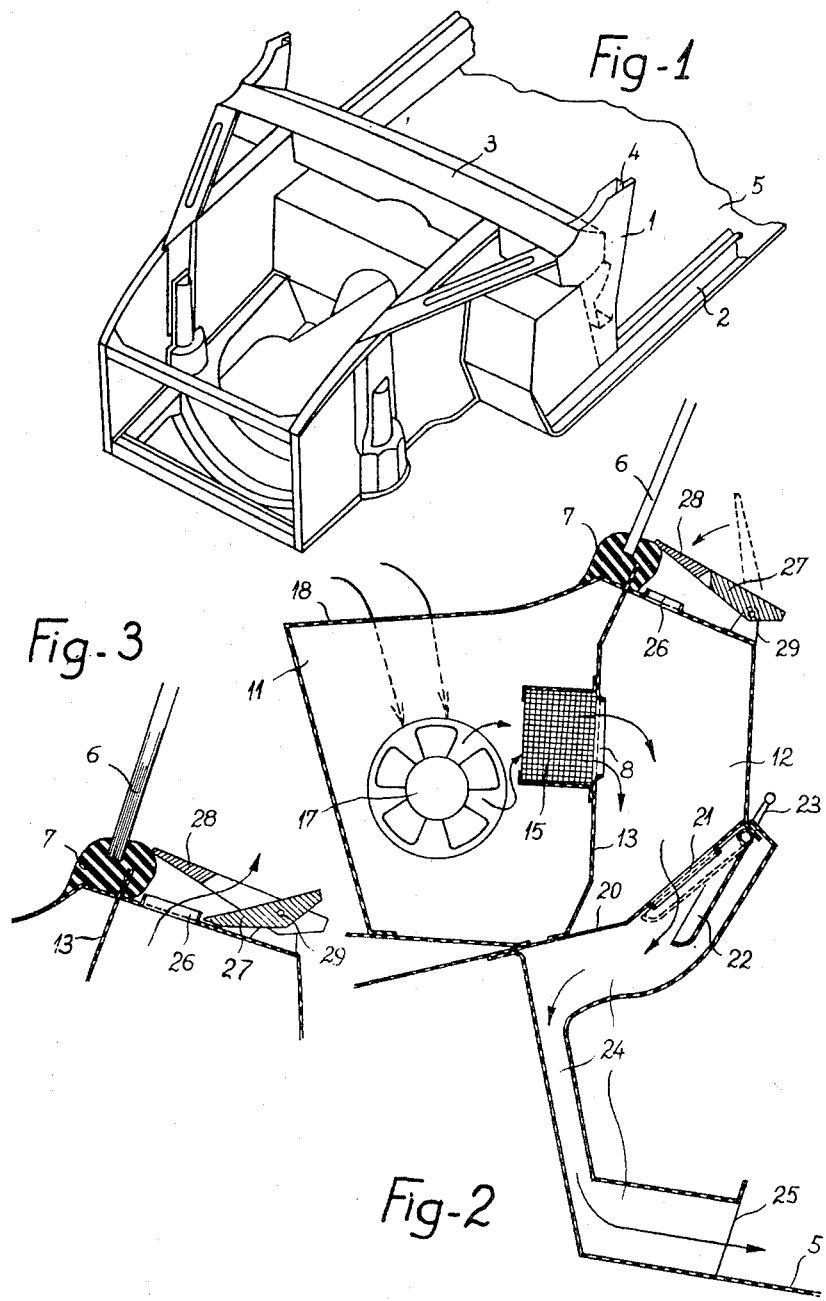

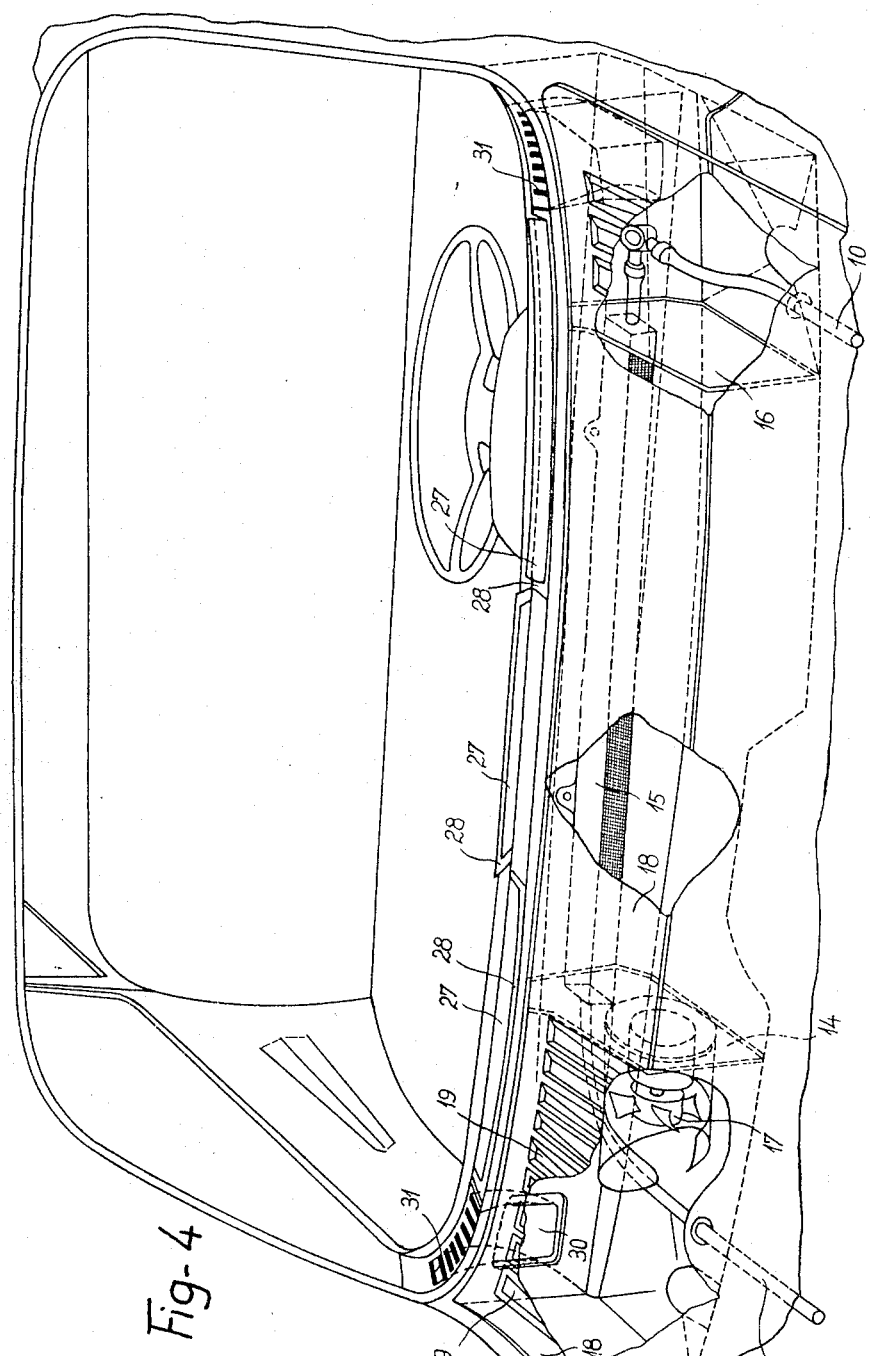

United States Patent Office 3,289,564
Patented Dec. 6, 1966

3,289,564
AIR-CONDITIONING DEVICES FOR AUTOMOBILE VEHICLES
Gaëtan de Coye de Castelet, Billancourt, France, assignor to Regie Nationale des Usines Renault, Billancourt, Seine, France
Filed Oct. 1, 1964, Ser. No. 400,787
Claims priority, application France, Oct. 3, 1963, 949,487, Patent 1,388,717
10 Claims. (Cl. 98—2)

The present invention relates to improvements in air-conditioning systems for the interiors of automobile vehicles, with a co-operation of devices having the particular function of propelling the air from the front of the vehicle body in a layer spread over the whole width of the interior, and to facilitate the evacuation of this air towards the rear, particularly by using the depression existing in certain external zones of the body, so as to improve the efficiency of the air conditioning and to distribute the conditioned air so as to suit the passengers requirements better, in accordance with the physiological principles of comfort.

The invention has also for its object to produce air-conditioned elements which are not bulky and which are easy to install and to remove.

The invention may be applied advantageously to all vehicles which have, disposed along a wall, a hollow transverse or longitudinal girder, which can advantageously serve, according to another object of the invention, as a housing for the majority of the air conditioned means and, in the case of a transverse position of said girder, and rear face of which can support or may even constitute the vehicle dashboard.

In order to obtain an equal distribution of air to avoid turbulence due to concentrations of air pressure, the air displaced for example by a motor-fan set, is accumulated in air-tight casing constituted by the girder.

A hollow girder of this kind comprises a cold air compartment communicating with the exterior through a series of air-intakes formed in the girder and a warm air compartment capable of being put into communication with the passenger section of the vehicle.

The compartments are separated by a longitudinal partition, the partition comprising at least one orifice for the passage of air. A heating element such as a radiator with fins is arranged inside this passage which advantageously extends over the major part of the width of the girder or, in the case of a transverse girder, of the scuttle.

The lower portion of the warm air compartment communicates with a duct which extends over the major part of the vehicle wall, preferably over its whole width, and terminates close to the floor of the vehicle in an elongated orifice. One or more shutters are interposed between the warm air compartment and the duct.

According to another object of the invention, said warm air compartment can also be put into communication with the passenger section of the vehicle by an air outlet opening provided for in the girder. In this case, at least one closure shutter composed of a ventilation element and a de-misting element articulated on a common axis is mounted in such manner that the free edges of the elements are substantially oriented towards the window or windows provided for in the wall having the girder, and that the air-outlet opening is located between the base of the window or windows and the common axis. The dimensions of the ventilation element are such that the free edge of this latter is located between the edge of the air-outlet opening which is farthest from the window or windows and the common axis when the ventilation element is lowered into the ventilation position. On the other hand, this free edge must re-join the rear edge of the de-misting element, which then forms with the ventilation element a single continuous shutter extending from the common axis to the base of the window or windows when the two elements are placed in the closed position, one in line with the other. When these two elements in line with each other are raised to a position in which the front edge of the de-misting element has moved away from the window or windows, they form an air-deflector which directs the jet of air towards the window or windows.

Advantageously and in the most application cases of the device according to the invention, the greatest dimension of the warm air compartment, the heating radiator, the section of the duct and its inferior elongated orifice and of the air outlet orifice provided for in the upper portion of said compartment will have the greatest possible length compatible with the dimension of the wall.

The invention also includes other details which will in any case be brought out in the description which follows below of one example of construction of a device according to the invention, this description being made with reference to the accompanying diagrammatic drawings, in which:

FIG. 1 is a perspective view of the front portion of a vehicle chassis with a hollow girder utilized in accordance with the invention;

FIG. 2 is a view in cross-section of the hollow girder;

FIG. 3 is a view in cross-section showing the air-outlet opening provided with the shutter composed of two elements, in the de-misting position;

FIG. 4 is a general view, partly broken away, of the front portion of the device according to the invention;

Figure 5:
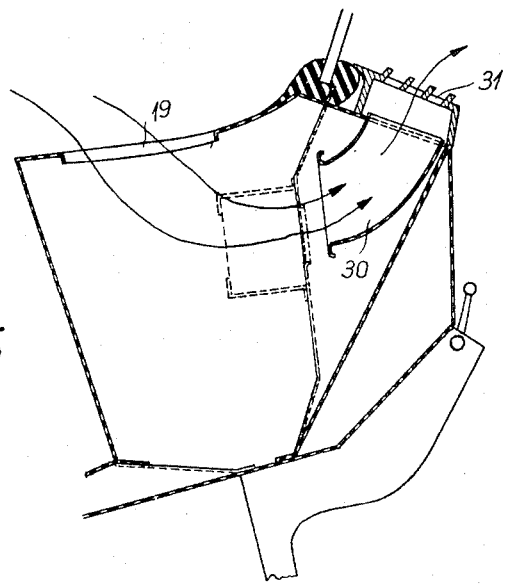
FIG. 5 is a view in cross-section of an additional lateral ventilation device.

There can be seen from FIG. 1 the front portion of the chassis of a vehicle comprising a hollow transverse girder 3. This latter couples together two front feet 1 forming casings 4 welded to the side girders 2, to which is fixed the flooring 5.

As can be seen from FIG. 2, the hollow girder 3 is arranged under the windscreen 6 engaged and held in an elastic beading 7 fixed on the girder. The latter comprises a front compartment 11 and a rear compartment 12 separated by a substantially vertical partition 13, in which is formed an elongated orifice 8. This orifice 8 can of course be replaced by a number of holes or slots if it is desired to give increased strength to the partition 13. Fixed in the front compartment 11 against the orifice 8, a radiator 15 with fins is connected to the liquid-cooling circuit of the engine by pipes 9 and 10 (see FIG. 4).

The front compartment 11 is closed laterally on both sides by the lateral partitions 14 and 16, shown in FIG. 4. A helicoidal electric fan 17 mounted in the partition 14 draws in the external air through the air-intake orifices 19 formed in a part of the upper wall 18 of the hollow girder 3, this being part of the wall located laterally beyond the front compartment 11.

The bottom 20 of the rear compartment 12 is provided with two openings 21 arranged alongside each other and provided with two movable shutters 22 coupled together and actuated by a handle 23. The openings 21 communicate with a duct 24 which extends over the whole width of the vehicle and terminates in the proximity of the floor 5 in an elongated horizontal orifice 25 which is directed towards the rear of the vehicle.

In accordance with the sectional view given in FIG. 2 and the perspective view of FIG. 4, the rear compartment 12 is provided at its upper portion with three slots arranged in line with each other or a number of air outlet openings 26 arranged in the same manner and located close to the bead 7 of the windscreen. With each slot or series of openings is associated a closure shutter composed of a ventilation element 27 and a de-misting element 28 articulated about a common shaft 29 fixed on the top of the cross-girder 3. The de-misting element 28 forms a frame in which the ventilation element 27 can pivot independently. The operating devices for the shutters, such as knobs or levers, have not been shown.

The width of the elements 27 and 28 is provided in such manner that the front edge of the de-misting element 28 rests on the beading 7 when it is lowered (FIGS. 2 and 3), preventing the passage of air towards the windscreen, and that the front edge of the ventilation element 27 is applied either on the cross girder between the air-outlet openings 26 and the common shaft 29, permitting a flow of air to pass upwards and to the rear of the vehicle interior when the element 27 is lowered (see FIG. 3), or against the rear edge of the de-misting element 28 (see FIG. 2). In this latter case, the two elements 27 and 28 then form only a single shutter which completely closes the air outlet when it is lowered, or directs the flow of air against the windscreen when it is lifted, for the purpose of de-misting. In FIG. 2, the shutter is shown in dotted lines in this latter position.

The direct passage of unheated air into the vehicle interior can be provided for. For this purpose, the lateral compartment formed in the cross-girder between the fan 17 and the intakes 19 can be put into communication with the interior of the vehicle by an air-pipe 30 opening into the latter through lateral slots 31. A similar compartment may be provided in the other extremity of the hollow girder, as shown in FIGS. 4 and 5. Shutters or sliding members (not shown) enable these unheated air-intakes to be closed at will.

Figure 6:
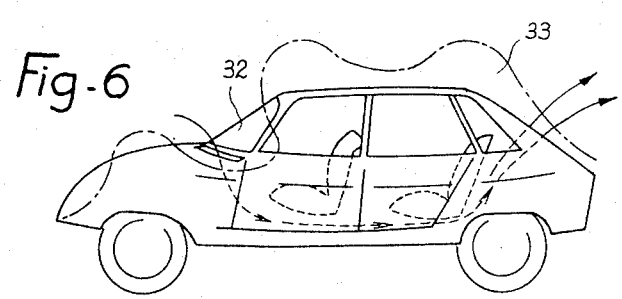
FIG. 6 is a side view of a vehicle showing the general arrangement of the device according to the invention.

In an alternative form of construction, the action of the ventilator 17 can be considerably reinforced and this latter may even be dispensed with if the air-intake orifices 19 are placed in a pressure zone and the evacuation orifices in a depression zone of the vehicle. If the outline of the profile of the vehicle is compared with a curve for which the pressures and depressions are zero, there can be superimposed on this first curve a second curve in chain-dotted lines (FIG. 6), the outline of which will be such that the surfaces included between the two curves and external to the profile of the vehicle give the magnitude of the depressions and the internal surfaces give that of the aerodynamic pressures. The air-intake orifices 19 will be disposed in the pressure zone 32 and the evacuation orifices in the rear depression zone 33, in order to obtain the favorable conditions which permit correct ventilation to be obtained without making use of a fan.

Figure 7:
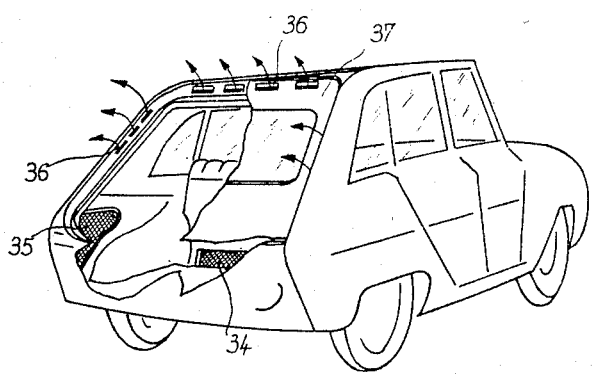
FIG. 7 is a view in perspective of the rear portion of a vehicle, showing the air-evacuation device according to the invention.

The air distribution arrangement which has been described co-operates advantageously with an evacuation arrangement provided at the rear of the vehicle interior and having outlet orifices located in the depression zone 33, this evacuation system being shown by way of example in FIG. 7.

A passage 34 is arranged under the seats or squabs for the air coming from the orifice 25 (FIG. 2). Air outlets 35 take-in the air from the sides of the vehicle interior at its lower portion, behind the wheel casings, and convey it through conduits formed for example in the girders, ribs or hollow cross members of the body up to a series of vents 36 formed on the top and the sides of the frame of the rear body panel 37.

The operation of the devices described is clearly shown in FIGS. 2 to 7, in which the paths of the air are shown by arrows.

The possibilities of use left at the disposal of the driver are as follows:

The putting into service or the stopping of the heating element 15 enables hot or cold air to be obtained. Air passing into the rear compartment 12 can be directed simultaneously or separately towards the bottom of the vehicle interior by operating the shutter 22, towards the windscreen by lifting the de-misting element 28, towards the upper part of the vehicle interior by lowering the ventilation element 27, and the closure of all the shutters enables the ventilation to be cut-off entirely. In addition, the independent operation of each of three sets of shutters 27, 28 enables the ventilation to be separately controlled for three longitudinal zones extending over the direction of the length of the vehicle interior.

Figure 8:
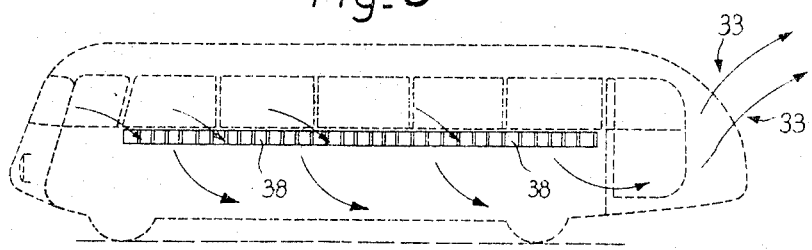
FIG. 8 shows the position of an air supply device according to the invention and provided for along a longitudinal wall of a vehicle.

As appears from the FIGURE 8, the air supply device according to the invention can be provided for not only in the front or rear portions of a vehicle, but also along its lateral walls. The warm air compartment 38 is comprised in the two longitudinal structures situated e.g. under the bay-windows of a motor coach.

I claim:

1. An air-conditioning device for automobile vehicles having a hollow girder forming a transverse reinforcing member arranged substantially under the windscreen of a vehicle comprising a partition perpendicular to the longitudinal plane of symmetry of the vehicle separating said hollow girder into a hot-air compartment and a forward cold air compartment, means communicating with the exterior of the body to said cold-air compartment, radiator means disposed in means connecting said hot- and cold-air compartments, at least one orifice in said hot-air compartment connecting said compartment to the passenger space, duct means communicating with the lower part of said hot-air compartment and extending over the whole width of the vehicle and terminating in the proximity of the floor of the vehicle by an elongated orifice orientated towards the rear of the vehicle, at least one shutter means being disposed between the hot-air compartment and said orifice of said duct, and an evacuation conduit constituted by parts of the vehicle body and opening into the ambient air in a zone in which the ambient air is put into depression by the movement of the vehicle.

2. An air-conditioning device according to claim 1, wherein the communicating means comprises suction openings opening into the exterior of the vehicle body and that a fan is interposed between the suction openings and the cold-air compartment.

3. An air-conditioning device according to claim 2, wherein a direct air conduit provided with a closure device couples directly the passenger space and the hot-air compartment.

4. An air-conditioning device according to claim 1, wherein the hot-air compartment also communicates with the passenger space of the vehicle by an air-outlet device provided with at least one air-outlet opening directed substantially towards the top of the passenger space.

5. An air-conditioning device according to claim 4, wherein the air-outlet opening is equipped with at least one moving closure shutter arranged in such manner that the jet of air can be directed against the inner face of a window provided in the wall of the vehicle, the closure shutter composed of a ventilation element and a de-misting element articulated on a common axis being mounted in such manner that the free edges of the elements are substantially directed towards the window of the vehicle and that the air-outlet opening is located between the base of the windscreen and the common shaft, while the dimension of the ventilation element is such that the free edge of this latter is located between an edge of the air-outlet opening farthest away from the windscreen and the common shaft when the ventilation element is lowered to the ventilation position, and that it re-joins a rear edge of the de-misting element, which selectively forms with the ventilation element a single continuous shutter extending from the common shaft to the base of the windscreen, when the two elements in line with each other are placed in the closed position, and forms a de-misting air-deflector when the two elements in line with each other are raised to a position in which a front edge of the de-misting element is moved away from the windscreen.

6. An air-conditioning device according to claim 5, wherein direct lateral air-conduits provided with closure devices are provided laterally on each side of the hot-air and cold-air compartments, in the extremities of the hollow girder.

7. An air-conditioning device according to claim 1, wherein the evacuation conduit delivers to the exterior of the passenger space through air-vents opening into the zone in which the air is put under depression, these air vents being formed on the edge and the sides of the frame of a rear panel of the vehicle body.

8. An air-conditioning device for automobile vehicles which comprises an elongated hot-air compartment arranged along one of the walls of the vehicle to the rear of a heating radiator of at least one element, wherein the hot-air compartment communicates with the passenger space of the vehicle by an air-outlet device having at least one air-outlet opening equipped with at least one moving closure shutter provided in such manner that the jet of air can be directed against the inner face of a windscreen provided in the said wall of the vehicle, the said closure shutter composed of a ventilation element and a de-misting element having each a front part with a free edge and a rear part, and being articulated near their rear part on a common shaft mounted in such manner that the free edges of the elements are substantially directed towards the windscreen of the vehicle and that the air-outlet opening is located between the base of the windscreen and the common shaft while the dimension of the ventilation element is such that the free edge of this latter is located between the edge of the air-outlet opening farthest away from the windscreen and the common shaft when the ventilation element is lowered to the ventilation position, and that it re-joins the rear edge of the de-misting element which selectively forms with the ventilation element a single continuous shutter extending from the common shaft to the base of the windscreen when the two elements are in line with each other and are placed in a closing position and form a de-misting air deflector when said two elements are raised in line with each other.

9. An air-conditioning device according to claim 8, wherein the air-outlet opening is provided with a plurality of closure shutters in such manner that the air passing through the opening can be selectively distributed over the whole width of the passenger space.

10. An air-conditioning device for automobile vehicles comprising an elongated hot-air compartment forming a part of a transverse girder which supports said windscreen, a cold-air compartment disposed adjacent and forward of said hot-air compartment, means connecting said cold-air compartment to the ambient air, means interconnecting said hot- and cold-air compartments, heating radiator means disposed in said interconnecting means, at least one orifice means in said hot-air compartment connecting said compartment to said passenger space of the vehicle, each said orifice having an air outlet device having therein at least one air outlet opening equipped with shutter means provided in such a manner that the jet of air can be selectively directed against the inner face of said windscreen, said closure shutter comprised of a ventilation element and a de-misting element articulated on a common shaft and mounted in such manner that the free edges of the elements are substantially directed towards the windscreen of the vehicle and that the air outlet opening is located between the base of the windscreen and the common shaft while the dimension of the ventilation element is such that the free edge of the latter is located between the edge of the air outlet opening furthest away from the windscreen and the common shaft when the ventilation element is lowered to the ventilation position and that it rejoins the rear edge of the demisting element which then forms with the ventilation element a single continuous shutter between the common shaft to the base of said windscreen when the two elements are in line with each other and arranged to the position in which the front edge of the de-misting element is moved away from the windscreen.

References Cited by the Examiner
UNITED STATES PATENTS

| | | | |
|---|---|---|---|
| 2,295,750 | 9/1942 | Norris | 98—2.4 |
| 2,738,718 | 3/1956 | Reynolds | 98—2.4 |
| 2,996,255 | 8/1961 | Boylan | 98—2.4 |

MEYER PERLIN, *Primary Examiner.*